March 22, 1938.  E. F. SALSBURY  2,111,691
MOTOR VEHICLE
Filed April 7, 1936  3 Sheets-Sheet 1
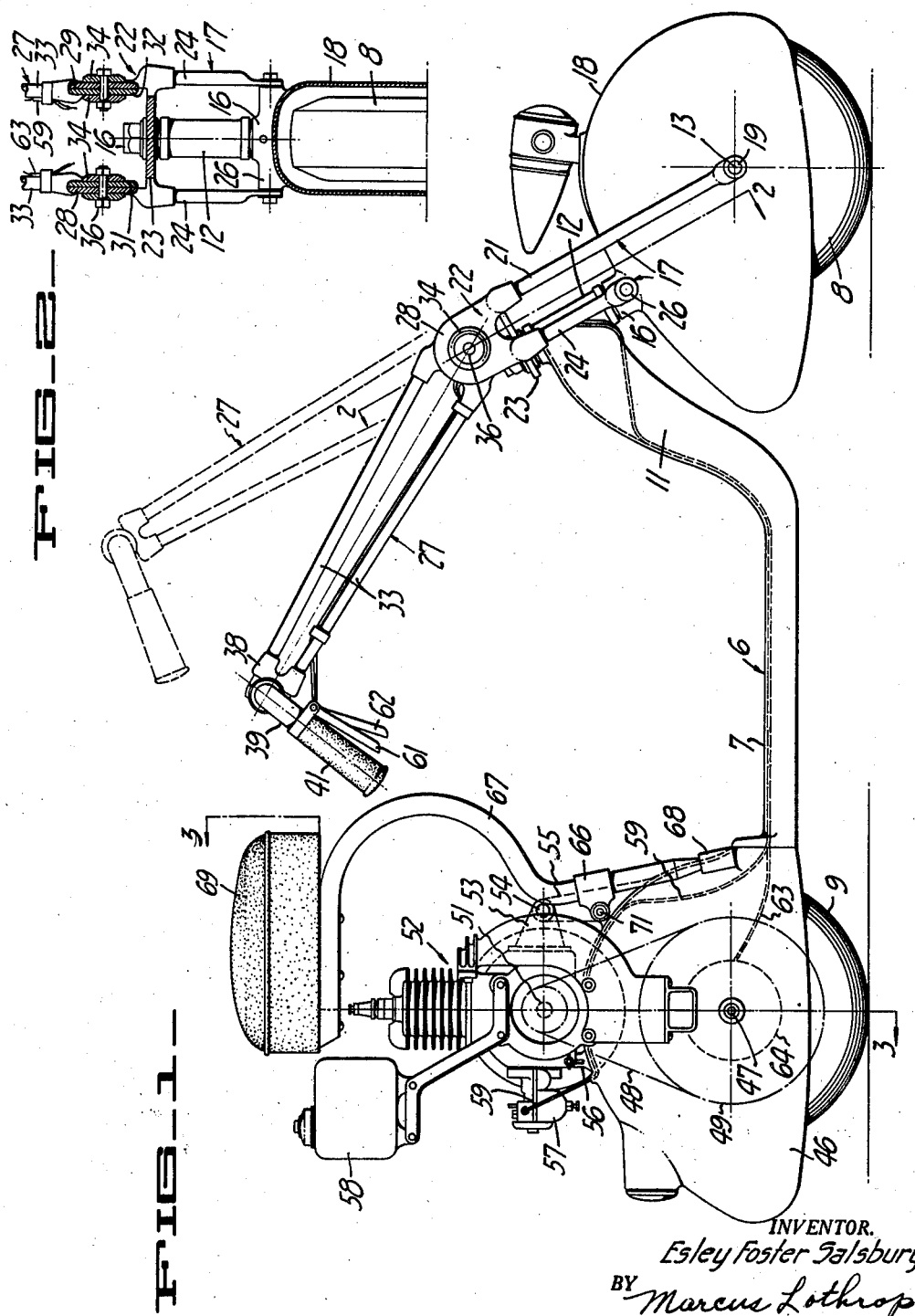
INVENTOR.
Esley Foster Salsbury
BY Marcus Lothrop
ATTORNEY March 22, 1938.　　　E. F. SALSBURY　　　2,111,691
MOTOR VEHICLE
Filed April 7, 1936　　　3 Sheets-Sheet 2
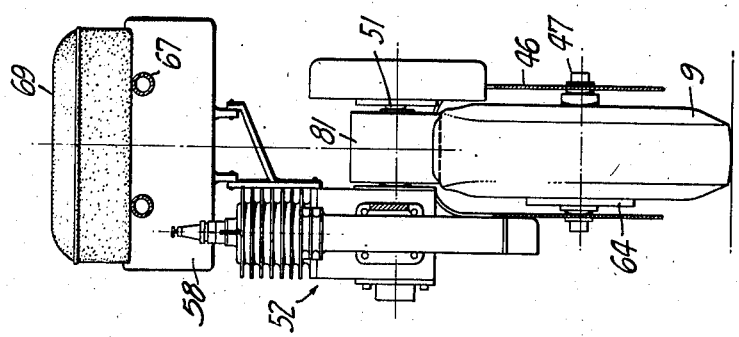
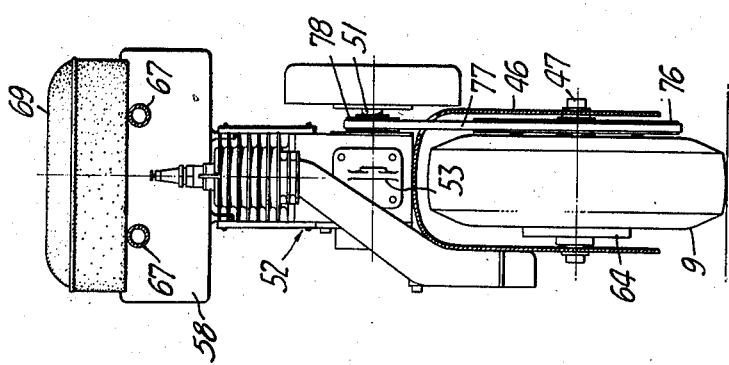
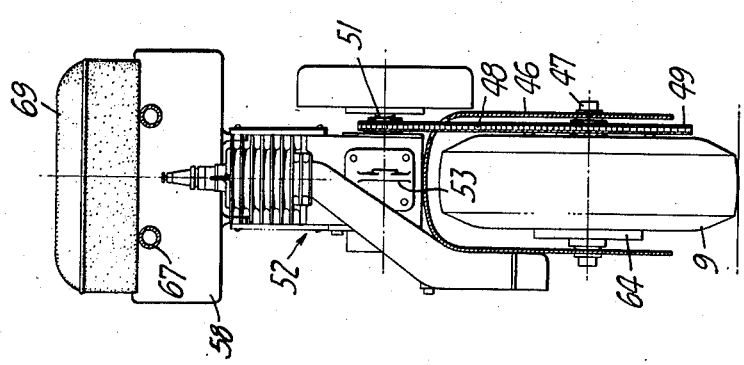
INVENTOR.
Esley Foster Salsbury
BY Marcus Lothrop
ATTORNEY

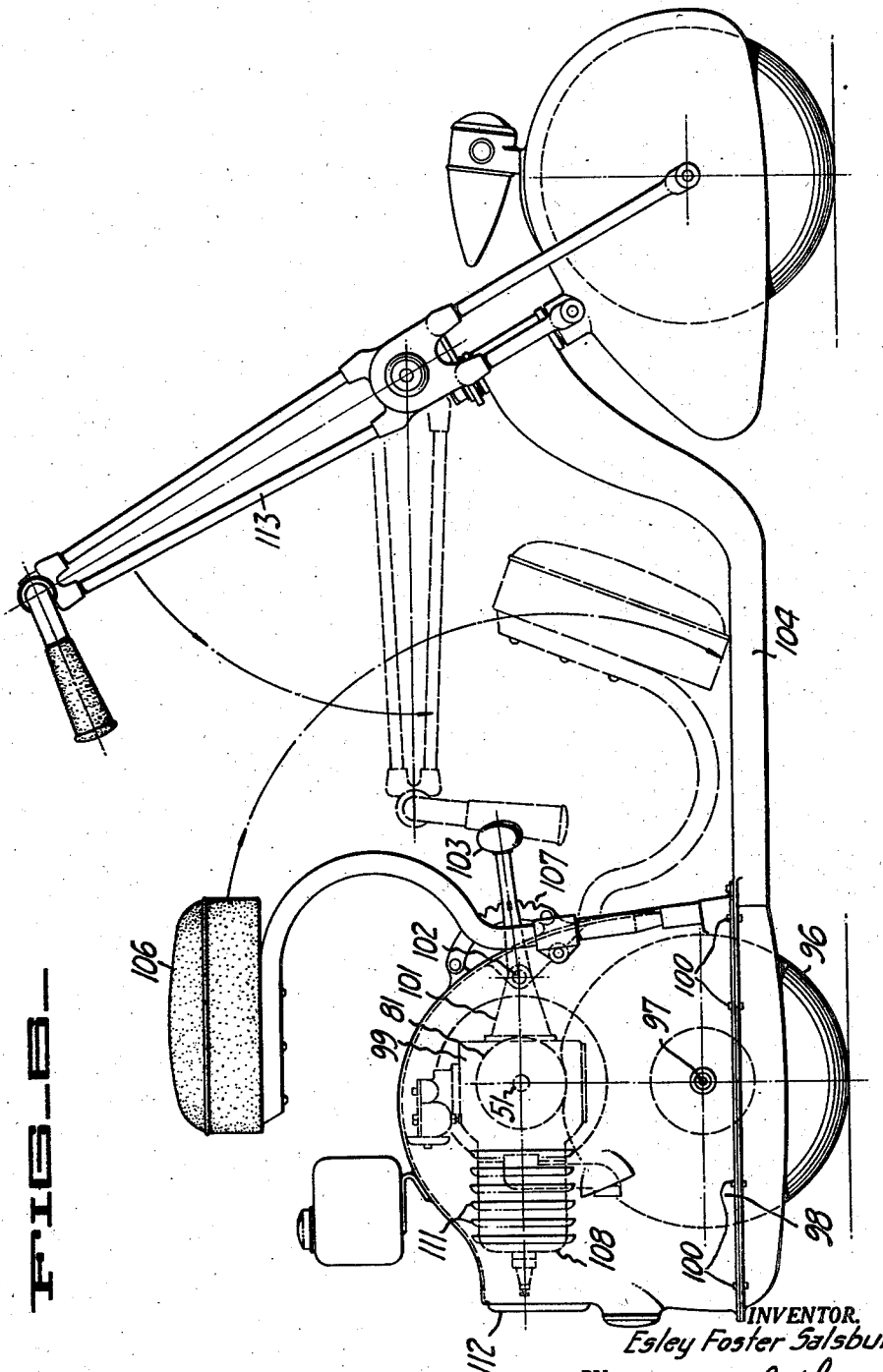

Patented Mar. 22, 1938

2,111,691

UNITED STATES PATENT OFFICE 2,111,691

MOTOR VEHICLE

Esley Foster Salsbury, Orinda, Calif.

Application April 7, 1936, Serial No. 73,078

1 Claim. (Cl. 180—33)

My invention relates to vehicles primarily useful for auxiliary transportation, in carrying a single passenger on relatively short trips.

An object of my invention is to provide a motor vehicle which is sufficiently substantial and fleet as to transport a full-grown adult at a speed of from twenty-five to thirty-five miles per hour.

Another object of my invention is to provide a motor vehicle which is sufficiently light and compact as to be disposable aboard another vehicle, such as an automobile, yacht or airplane.

A further object of my invention is to provide a vehicle for relatively short trips, which is self-contained and is inexpensive in first cost and maintenance.

The foregoing and other objects are attained in the embodiments of the invention illustrated in the drawings, in which—

Fig. 1 is a side elevation of one form of motor vehicle in accordance with my invention.

Fig. 2 is a cross-section the plane of which is indicated by the line 2—2 of Fig. 1.

Fig. 3 is a cross-section the plane of which is indicated by the line 3—3 of Fig. 1.

Fig. 4 is a cross-section similar to Fig. 3 but showing a modified form of drive arrangement.

Fig. 5 is a cross-section similar to Figs. 3 and 4 but showing a further modified form of drive arrangement.

Fig. 6 is a side elevation of a vehicle similar to Fig. 1 but somewhat modified.

In its preferred form, the motor vehicle of my invention includes a pair of wheels in file, connected by a frame providing a passenger-supporting portion and having a driving motor arranged substantially above one of the wheels and having a steering column for the other wheel movable from a position substantially above the wheel to another position substantially between the wheels.

In the form of motor vehicle of my invention especially disclosed in Figs. 1, 2 and 3, I preferably provide a frame, generally designated 6, which conveniently is fabricated of one or more metal stampings. The central part of the frame provides a passenger-carrying platform 7 or portion located between two ground-engaging wheels, such as a front steering wheel 8 and a rear driving wheel 9, both of which are equipped with pneumatic tires of the balloon type to afford resilience in suspension. The frame 6 adjacent its forward part is upswept, as at 11, to unite with a steering journal 12 inclined at an angle to the vertical and having an axis which is in the general plane of the steering wheel 8 but which lies somewhat behind the rotational axis 13 of the wheel.

The journal 12 forms a mounting for the shank 16 of steering forks 17 which are constituted largely by a hood or shroud 18 overlying and generally encompassing the wheel 8. The wheel is mounted on an axle 19 which is not only mounted in the shroud 18 but is likewise mounted in auxiliary struts 21 which extend to a yoke 22 joined to the member 16 by a plate 23. Also joined to the plate 23 are struts 24 acting as reinforcements and fastened to bosses 26 extending from the forks.

Articulated to the steering forks is a steering column, generally designated 27, and to provide a suitable connection the members 22 terminate in a pair of friction plates 28 and 29 in contact with which are friction plates 31 and 32, respectively, at the lower ends of each of a pair of struts 33 constituting the column 27. Washers 34 and adjustable fasteners 36 provide means for regulating the rotational friction between the pads, so that movement of the column 27 about the axis of the fasteners 36, which axis is at right angles or perpendicular to the axis of the member 16, can be any desired value. The column 27 at its upper end terminates in a mounting 38 engaging a steering means such as a pair of handle bars 39 provided with hand grips 41. With this arrangement the steering means 39 is movable from an upper position substantially over the steering wheel 8 to a lower position in juxtaposition to the passenger-carrying platform 7, so that the height of the steering column when in its upper position can be materially reduced to increase the compactness of the vehicle for storage purposes.

The frame 6 adjacent the wheel 9 is enlarged by a housing 46 which substantially encompasses and shrouds the driving wheel 9 and forms a mounting for the wheel axle 47. The housing 46 is preferably pierced to pass a drive chain 48 (Fig. 3) which engages a sprocket 49 connected to the driving wheel 9 and likewise engages the drive shaft 51 of a suitable driving engine 52. This engine is a standard kind of internal combustion engine available on the market. It is disposed preferably immediately above the driving wheel 9, so that the weight of the driving engine and its accessories will be almost entirely imposed upon the driving wheel to increase the traction thereof. The engine is preferably secured to the frame 6 by a bracket 53 on the engine, which is connected by a pivot pin 54 to a similar bracket 55 connected to the shroud 46 which is incorporated in the frame. An adjustable bracket connection 56 permits regulation of the chain tension by holding the engine in an adjusted position.

The engine 52 is provided with a carburetor 57 which receives its fuel from a tank 58 mounted on the engine and disposed above the wheel 9. To control the operation of the engine, I preferably extend a Bowden wire 59 from the carburetor down underneath the passenger platform 7, up around the fork structure 16, and along the steering column 27 to a suitable control handle 61 adjacent the hand grip 41. By suitably manipulating the control 61, the operator can regulate the operation of the engine. The control is not affected by the particular position of the steering column at any instant or by the particular adjusted position of the engine adopted to give the requisite tightness to the chain 48. Preferably, a similar control handle 62 and a Bowden wire controller 63 pass generally along the route of the wire 59 to actuate a brake 64 incorporated in the wheel 9.

While the passenger utilizing my motor vehicle ordinarily stands on the platform 7, I provide means so that he may be seated. To this end a suitable part of the frame carries a pair of brackets 66 through which terminally tapered support tubes 67 slidably pass, to engage a pair of sockets 68 on the frame. The support tubes 67 carry a cushion 69. In order that the seat can be moved to a folded position to increase the compactness of the structure, the bracket 66 is preferably connected to the frame by a pivot 71, so that, by lifting the support tubes 67 to disengage the socket 68 and then rotating the brackets 66 about their fastening 71, the cushion 69 can be brought into proximity with the platform 7. When the steering column 27 is likewise folded, the mechanism is sufficiently compact as to be readily stowed in a small space for transportation by another vehicle.

As alternatives to the chain drive disclosed in Figs. 1 and 3, I provide, as disclosed in Fig. 4, that the rear wheel 9, instead of carrying a sprocket 48, may carry a large belt pulley 76 for the reception of a V-belt 77 preferably of the automotive type, which also engages a V-pulley 78 on the drive shaft 51 of the engine 52. With this arrangement the tightness of the belt is adjusted in the same fashion as is the tightness of the chain 48, by the appropriate pivotal movement of the engine 52 about its support bracket pin 54; and in this instance if the engine is disposed so that the belt 77 has an appreciable slack, then a clutching effect is provided so that the engine can still be operated, even though no drive is transmitted to the wheel 9.

The arrangement of Fig. 5 is an alternative to the previously described drive arrangement. The wheel 9 is engaged by a friction roller 81 on the engine shaft 51, so that the driving force of the engine 52 is transmitted by the friction roller directly to the periphery of the wheel 9. With this arrangement likewise, the engine 52 can be rotated about its pivotal support 54 in order to disengage the friction roller 81 from the wheel 9 or to force it into tight engagement therewith and thereby to provide a clutching action to control the transmission of driving effort from the engine to the driving wheel.

A modified form of structure is shown in Fig. 6. This structure is substantially identical with that previously described, so far as the steering wheel and steering mechanism are concerned, but a somewhat different arrangement of framework and driving mechanism is provided. In the arrangement of Fig. 6, the rear wheel 96 is mounted on an axle 97 carried in a shroud 98 which substantially encompasses the wheel and is detachably connected by bolts 100 to the remainder of the general framework of the vehicle. The driving engine 99 is disposed substantially above the wheel 96 and is connected thereto for driving relationship in any appropriate way. Since the driving mechanism and the rear wheel are mounted in or on the detachable shroud 98, they can be handled separately as a unit.

Preferably, the engine is mounted on a bracket 101 connected to a pivot pin 102 on the shroud. The bracket 101 is extended to provide a lever 103 available to the occupant of the passenger-carrying platform 104 or of the seat 106. By suitably manipulating the handle 103, which is retained in position by spring engagement with a notched sector 107, the engine can be clutched or declutched with the driving wheel 96 whenever a belt or friction drive is employed; or a special clutch mechanism can be appropriately actuated in the event a chain drive is utilized.

The engine 99 is disposed with its cylinder 108 substantially horizontal, and, since the cylinder is preferably air-cooled, I provide air inlet apertures 111, suitably guarded, and an air outlet 112, so that ample air flow past the engine cylinder is provided, even though the entire engine and most of its auxiliaries are disposed within the shroud 98. The arrangement and mounting of the seat 106 and the steering column 113 are virtually the same as disclosed in connection with the vehicle of Fig. 1, and when the seat and the steering column are folded into their lowered positions adjacent the passenger platform 104 a very compact relationship of the parts is provided.

I claim:

In a motor vehicle having a frame, front and rear wheels for said frame, said frame having a passenger platform arranged between and below the centers of said wheels, and means for steering said front wheel, the combination of a rear wheel driving assembly comprising, a shroud provided on the frame and substantially encompassing said rear wheel, said rear wheel being rotatably mounted on said shroud, a driving engine carried by said shroud and disposed above said rear wheel, and means for transmitting power from said engine to said rear wheel.

ESLEY FOSTER SALSBURY.